_United States Patent_ [19]

Wellman, Jr. et al.

[11] 4,370,692

[45] Jan. 25, 1983

[54] GROUND FAULT PROTECTIVE SYSTEM REQUIRING REDUCED CURRENT-INTERRUPTING CAPABILITY

[75] Inventors: Carl E. Wellman, Jr.; Richard E. Hornung, both of Louisville, Ky.

[73] Assignee: General Electric Company, Louisville, Ky.

[21] Appl. No.: 282,574

[22] Filed: Jul. 13, 1981

Related U.S. Application Data

[63] Continuation of Ser. No. 951,892, Oct. 16, 1978.

[51] Int. Cl.³ .............................................. H05B 9/00
[52] U.S. Cl. .................................. 361/109; 361/46; 219/452; 337/129
[58] Field of Search .................................. 361/44–46, 361/94, 109; 219/452; 337/129

[56] References Cited

U.S. PATENT DOCUMENTS

| | | | |
|---|---|---|---|
| 3,414,778 | 12/1968 | Gilbreath et al. | 361/109 X |
| 3,525,018 | 8/1970 | Murphy et al. | 361/46 |
| 3,555,359 | 1/1971 | Morris et al. | 361/45 |
| 3,579,038 | 5/1971 | Backderf et al. | 361/109 X |
| 3,633,070 | 1/1972 | Vassos et al. | 361/46 |
| 3,895,263 | 7/1975 | Clark | 361/46 |
| 3,899,717 | 8/1975 | Legatti et al. | 361/46 |
| 3,968,409 | 7/1976 | Windler | 361/109 |
| 4,044,224 | 8/1977 | Jenkins et al. | 219/322 |
| 4,054,857 | 10/1977 | Bowling | 337/129 |

FOREIGN PATENT DOCUMENTS 946623 1/1964 United Kingdom ................ 219/452

Primary Examiner—G. Z. Rubinson
Assistant Examiner—L. C. Schroeder
Attorney, Agent, or Firm—H. Neil Houser; Radford M. Reams

[57] ABSTRACT

A ground fault interrupter type device for protecting an electrical load device such as a range which has conductors supplied from a power source including overcurrent interruption means for interrupting the power source when a predetermined current threshold is exceeded. The electrical load device is subject to a first class of failure characterized by excessive current flow between at least one of the conductors and a ground reference point, with circuit current remaining at or below the predetermined current threshold; and to a second class of failure characterized by current through at least one of the conductors being above the predetermined current threshold. Failures of the second class include ground fault failures. In order to reduce the current interruption capability requirement for the ground fault interrupter device, there is included a means for preventing conductor interruption thereby in the event a failure of the second class occurs. Accordingly, the current-interrupting capability is at least as high as the predetermined current threshold but less than the maximum current which may flow during a failure of the second class. In the illustrated embodiments, the means for preventing conductor interruption in the event a failure of the second class occurs is a time delay which delays the activation of the ground fault interrupter for an interval sufficient to allow the overcurrent interruption means to interrupt the power source in the event a failure of the second class occurs.

16 Claims, 2 Drawing Figures

GROUND FAULT PROTECTIVE SYSTEM REQUIRING REDUCED CURRENT-INTERRUPTING CAPABILITY

CROSS-REFERENCE TO RELATED PATENT

This is a continuation of application Ser. No. 951,892, filed Oct. 16, 1978.

Aspects of the present invention are disclosed but not claimed in commonly-assigned U.S. Pat. No. 4,054,857, issued Oct. 18, 1977, in the name of Teamus Bowling.

BACKGROUND OF THE INVENTION

The present invention relates to protection against leakage currents to ground, particularly in an electric range employing sheathed electrical resistance heating units.

In electrical load devices supplied through conductors from a power source there is a particular failure mode known as a ground fault where current flows between one of the "hot" conductors and ground. To alleviate the problems posed by such ground faults, various devices known as ground fault interrupters (GFI's) have been developed and are commercially available. A GFI senses any minute leakage current flowing within a load device from a line "hot" conductor to ground. When such leakage current is sensed, current to the load device is immediately interrupted, thereby avoiding a shock hazard. A power relay typically does the actual interrupting. The specific way in which a ground fault condition is usually sensed is by employing a differential current transformer to detect a current imbalance in the power input lines. If the current flowing into the load does not exactly equal the current flowing out of the load, then it is presumed that some of the current is diverting to ground. Examples of such ground fault interrupters are disclosed in Vassos et al U.S. Pat. No. 3,633,070 and Legatti et al U.S. Pat. No. 3,899,717. The ground fault interrupters disclosed in both of these patents also include time delay means.

It will be appreciated that most power sources have some form of overcurrent protection. This overcurrent protection may be provided by a fuse or circuit breaker which serves to interrupt the power source when a predetermined current threshold is exceeded. In order to prevent false or nuisance tripping as a result of momentary overloads, many fuses and circuit breakers have a time delay, with the amount of time delay before actual circuit interruption usually inversely related to the amount of overcurrent. Accordingly, an overcurrent protection means associated with a power source must be capable of reliably interrupting relatively large fault currents, substantially in excess of the predetermined current threshold. It is with such an overcurrent-protected power source that the present invention is intended to operate.

More particularly, the present invention is for use with load devices which are supplied from such an overcurrent-protected power source and which are subject to two general classes of failure. The first class of failure may conveniently be generally described as encompassing relatively low current ground fault failures more particularly characterized by excessive current flow between at least one of the conductors and a ground reference point and ground, with circuit remaining at or below the predetermined current threshold of the power source overcurrent protection means. The second class of failure may conveniently be generally described as encompassing relatively high current failures, which includes high-current ground fault failures, more particularly characterized by current through at least one of the conductors being above the predetermined current threshold of the power source overcurrent protection means. Each of these classes of failure is described in greater detail below in the particular context of an electric range.

Specifically, a typical heating unit in an electric range is a sheathed electrical resistance heating unit comprising a heating element in the form of a spiralled electrical resistance wire encased in an elongated ceramic-filled metal outer sheath which is electrically conductive and connected to the frame of the range. The ceramic material, typically magnesium oxide, transmits heat, but is an electrical insulator. Thus, the outer sheath becomes hot, but normally remains electrically insulated from the heating element.

One particular failure mode possible in such a sheathed electrical resistance heating unit is associated with a breakdown in the insulation qualities of the magnesium oxide, permitting current to flow between the heating element and the outer sheath. Typically, such a failure begins gradually, drawing relatively little current initially. This initial failure stage may be termed an incipient ground fault. However, if not immediately interrupted, a destructive high current arc may ensue.

It should be mentioned that, particularly in the context of a sheathed electrical resistance heating unit, it is possible to in effect directly sense leakage current to ground and interrupt the same without employing a differential current transformer. Such an approach is implemented in the arrangement disclosed in commonly-assigned U.S. Pat. No. 4,044,224, issued to Jenkins and Herbst, wherein the direct electrical connection between the outer conductive sheath and ground of the dishwasher heating unit is interrupted by a fusible link. During normal operation of the heating unit when the ceramic insulation material is intact, substantially no current flows through the outer sheath ground connection (with the exception of a small amount of AC leakage current largely as a result of capacitive and moisture effects). However, when a fault occurs, significant current flows through the outer sheath ground connection, causing the fusible link to open. Additionally, in the Jenkins and Werbst arrangement, a switch is mechanically arranged to open when the fusible link is broken, and this switch cuts off power to the heating element.

Accordingly, it would appear desirable to employ a ground fault interrupter type device in combination with a range to sense a ground fault type failure or an incipient ground fault type failure of the sheathed electrical resistance heating unit. In many cases such a failure, and particularly an incipient failure, is accompanied by only a slight increase in the current drawn from the supply, and hence is a failure of the first class as described above. In many instances, by disconnecting the power, the range is safe to operate again because the failed element remains inoperative but presents no safety hazard. Should a ground fault persist in the failed element, the circuit opens again.

A device such as a range is also subject to the second class of failure mentioned above characterized by a much higher current than a typical incipient ground fault. Such a failure of the second class may be a major arcing ground fault, a short circuit between a conductor anywhere in the range and ground where insulation may have deteriorated, or other type of short circuit. Since a household electric range is a relatively high current device, typically operating from a 40 or 50 ampere circuit, at 240 volts, substantial fault current may occur. In typical household range circuit protected by a 50 ampere circuit breaker, a momentary fault current of 3,000 amperes may sometimes occur. As a result, in the absence of the present invention, the circuit interrupting portion of any ground fault protection device for use in combination with an electric range would require circuit interrupting contacts sufficient to interrupt the maximum fault current which might conceivably occur. This is because any major high-current fault may in fact be, or be accompanied by, a ground fault, which would trigger the ground fault interrupter device. Therefore, to merely include a ground fault interrupter in a range, without the present invention, would lead to a requirement to provide relatively heavy contacts on any device employed as the current-interrupting element of the ground fault interrupter, with an attendant relatively high cost.

SUMMARY OF THE INVENTION

Accordingly, it is an object of the invention to provide an electrical load device such as a range with a ground fault type of protective system which does not require excessively heavy current interrupting contacts.

It is another object of the invention to provide a means for minimizing the current interrupting requirements of a ground fault interrupter device.

Briefly stated, in accordance with the concept of the invention, a GFI type device is employed to interrupt the relatively low current ground faults which occur during the first class of failure. However, actuation of the GFI-type device is avoided during relatively high current failures of the second class, allowing such high current failures to be interrupted by the overcurrent interruption means associated with the power source.

Briefly stated, and in accordance with one particular aspect of the invention, to ensure that the GFI type device does not attempt to interrupt a high current fault, a time-delay means is included which gives the over-current interruption means of the power source sufficient time to operate, if in fact the sensed ground fault is accompanied by high current.

Briefly stated, and in accordance with another aspect of the invention, the electrical load device comprises a controllable circuit interrupter which interrupts at least one of the conductors when activated. The controllable circuit interrupter has a current interrupting capability at least as high as the predetermined current threshold of the power source overcurrent interruption means, but a current interrupting capability less than the maximum current which may flow during a failure of the second class. Additionally, there is a means for sensing excessive current flow between at least one of the conductors and the ground reference point. Lastly, there is a means connecting the sensing means to the controllable circuit interrupter for activating the controllable circuit interrupter in response to excessive current flow between the conductor and the ground reference point. The connecting means includes a time-delay for delaying the activation of the controllable circuit interrupter for an interval sufficient to allow the over-current interrupting means to interrupt the power source in the event a failure of the second class occurs.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE DRAWINGS

Figure 1:
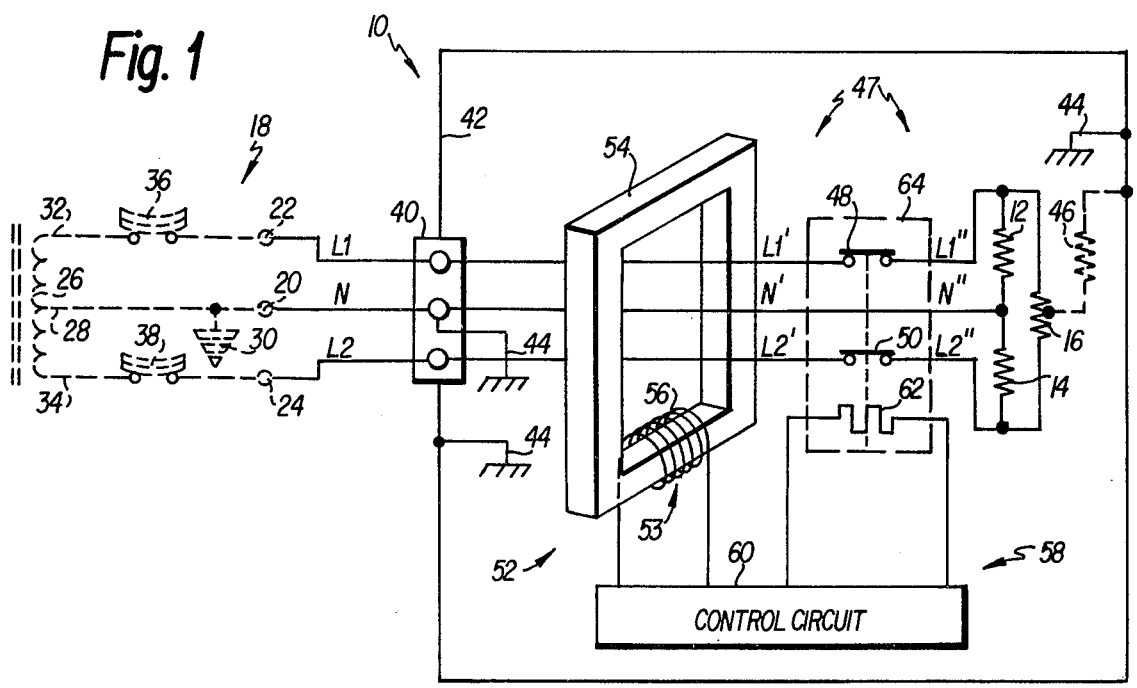
FIG. 1 is a circuit diagram of a system including a protected electrical load device according to the present invention; and, FIG. 2 is a detailed electrical schematic diagram of a control circuit for use in the system of FIG. 1.

Referring first to FIG. 1, an electrical load device generally designated 10 comprises an electric range having representative resistance heating elements 12, 14 and 16, which are the heating elements of representative sheathed electrical resistance heating units. The heating elements are adapted to be supplied through conductors L1, N and L2 from a standard single phase, three-wire power source 18, shown in phantom lines. The power source 18 has a neutral terminal 20 connected to the N conductor, and a pair of "hot" terminals 22 and 24 at opposite potentials relative to the neutral terminal 20 connected to the conductor L1 and L2, respectively.

More particularly, the power source 18 comprises a center tapped secondary winding 26 of a power distribution transformer. The secondary winding center tap 28, in addition to being connected to the neutral terminal 20, is typically connected to an earth ground 30.

For circuit protection in the event of a fault in the electric range 10, the outer terminals 32 and 34 of the secondary winding 26 are connected through overcurrent interruption means 36 and 38 to the terminals 22 and 24. While the overcurrent interruption means 36 and 38 are shown as thermal circuit breakers, it will be appreciated that various specific means may be employed, including simple fuses.

In a typical application, the power source 18 supplies 240 volts at 50 amperes between the L1 and L2 terminals 22 and 24. L1 and L2 are balanced with respect to N, and 120 volts is available between each of the conductors L1 and L2 and the N conductor.

The overcurrent interruption means 36 and 38 have a predetermined current threshold above which the power source 18 is interrupted. Typically, circuit interruption is not instantaneous for moderate overloads. The higher an overload current, the more rapid is the circuit interruption.

The electric range 10 is connected to the L1, N and L2 conductors through a terminal strip 40 mounted on the metal frame 42 of the range. Normally, the terminal strip center terminal which is connected to the N conductor is also connected directly to the range frame 42, as indicated by the representative ground connections 44. This provides a safety factor in that the frame 42 is normally held near earth ground potential at all times, preventing electric shock by contact therewith.

The representative resistance heating elements 12, 14 and 16 are supplied from the terminal strip 40 through a set of conductors L1', N' and L2', and through another set of conductors L1'', N'' and L2''. In the particular connection of the heating elements 12, 14 and 16, the element 16 is operated from 240 volts and therefore connected directly across the conductors L1'' and L2''.

The other two heating elements 12 and 14 are lower power heating elements and accordingly are operated from 120 volts by each being connected between one of the conductors L1" and L2" and the N" conductor. For clarity of illustration, conventional selector switches for the heating elements 12, 14 and 16 are not shown.

The range 10 is subject to a first class of failure characterized by excessive current flow between at least one of the internal conductors L1" or L2" and the ground reference point 44, but with the current drawn from the power source 18 within the normal current supplying capability of the power source 18, or in other words, at or below the predetermined current threshold of the overcurrent interruption means 36 and 38. In FIG. 1, such a failure of the first class is illustrated by a leakage resistance 46, shown in dash lines, between an intermediate portion of the resistance heating element 16 and the range frame 42 (which is connected to the ground reference point 44). Such a failure may be either an incipient breakdown of the ceramic insulation (not shown) between the heating element 16 and the grounded conductive outer sheath (not shown), or a more substantial breakdown of the insulation near a mid-point of the heating element 16 such that sufficient heating element resistance remains in the circuit to limit the current below the predetermined current threshold.

The range 10 is also subject to a second class of failure characterized by a relatively high current. Specifically, during a failure of the second class the current through at least one of the conductors is in excess of the predetermined current threshold of the overcurrent interruption means 36 and 38. Under such circumstances, at least one of the overcurrent interruption means 36 and 38 interrupts the power source 18, removing power from the range 10. Such a failure of the second class may be a short circuit anywhere within the range 10. One possibility is a breakdown of a heating unit near one of the ends thereof such that insufficient heating element resistance remains in the circuit to limit the current. It will be appreciated that failures of the second class as employed herein include both ground fault and non-ground fault failures. As previously mentioned in the "Background of the Invention", instantaneous current may be as high as 3,000 amperes (for a direct short across L1" and L2") before the overcurrent interruption means 36 and 38 have time to react.

Lastly, the range 10 includes a general means 47 for interrupting at least one of the conductors L1, L1', L1", L2, L2' or L2" in response to excessive current flow between the conductors L1" or L2" and the ground reference point 44. In accordance with the invention, the means 47 for interrupting includes means for preventing conductor interruption by the means 47 in the event a failure of the second class occurs.

More particularly, the means 47 for interrupting, and therefore the range 10, includes a pair of controllable circuit interrupters 48 and 50 which are interposed between the conductors L1' and L1" and the conductors L2' and L2", respectively. These conductors are interrupted when the controllable circuit interrupters 48 and 50 are activated. The current interrupting capability of the controllable circuit interrupters 48 and 50 is at least as high as the predetermined current threshold of the overcurrent interruption means 36 and 38 of the power source 18, but less than the maximuim current which conceivably may flow during a failure of the second class. Typically, the current interrupting capability of the circuit interrupters 48 and 50 is reasonably in excess of the predetermined current threshold, but well below the maximum current which may flow. Accordingly, the controllable circuit interrupters 48 and 50 may comprise relatively smaller contacts, and therefore be less expensive, than would otherwise be the case.

The means 47 for interrupting, and therefore the range 10, additionally includes a means 52 for sensing excessive current flow between either of the conductors L1" or L2" and the ground reference point 44. This sensing means 52 comprises a conventional differential current transformer 53 having an apertured core 54 and a secondary winding 56. In conventional fashion, the conductors L1', N' and L2' pass from appropriate terminals on the terminal strip 40 through the core aperture.

Additionally, there is a means 58 for connecting the sensing means 52 to the controllable circuit interrupters 48 and 50 for activating the controllable circuit interrupters 48 and 50 in response to excessive current flow between either one of the conductors L1" and L2" and the ground reference point 44. In accordance with a particular aspect of the invention, the connecting means includes time-delay means for delaying the activation of the controllable circuit interrupters 48 and 50 for an interval sufficient to allow the power source overcurrent interrupting means 36 and 38 to interrupt the power source 18 in the event a failure of the second class occurs.

More particularly, this connecting means 58 comprises a control circuit 60 which has an input connected to the differential current transformer secondary winding 56, and an output connected to a heater 62 which, together with the circuit interrupters 48 and 50, comprises a hot wire relay 64. A suitable hot wire relay 64 is described in the above-mentioned commonly assigned Bowling U.S. Pat. No. 4,054,857, the entire disclosure of which is hereby incorporated by reference. It will be appreciated that the thermal means of the heater 62 may advantageously be utilized to provide the necessary time delay. However, the delay may also be provided by the control circuit.

In the absence of any ground fault such as the leakage resistance 46, the net differential current carried by the conductors, L1', N' and L2' passing through the core 54 is zero. However, in the event of a ground fault in which a portion of any of the resistance heating elements 12, 14 or 16 develops excessive leakage current to the range frame 42, and therefore to the ground terminal 44, an unbalanced condition exists because a leakage current travels through the frame 42, bypassing the differential current transformer 53. In other words, the differential current transformer 53 senses more current flowing into the load resistances than out.

While suitable circuitry for the control circuit 60 is described below with reference to FIG. 2, it will be appreciated that it may take many forms. While the controllable circuit interrupters 48 and 50 are illustrated as the contacts of the hot wire relay 64, any suitable electromagnetic relay having normally closed contacts may be employed. Additionally, since the maximum current which the circuit interrupters 48 and 50 will be called upon to interrupt is limited by the present invention, a solid state switching means, such as a triac, may readily be employed, rather than relay contacts. In fact, the same contacts which are cycled to regulate the heating elements commonly called the "infinite heat control" may be made to respond additionally to the ground fault. Accordingly, the connecting means 58, which in the illustrated embodiment comprises the control circuit 60 and the heater 62, may be any suitable circuitry for interconnecting the sensing means 52 and the controllable circuit interrupters 48 and 50. Moreover, the means for sensing excessive current flow between one of the conductors L1" or L2" and the ground reference point 44 need not be a differential current transformer. As illustrated by the above-mentioned Jenkins and Herbst U.S. Pat. No. 4,044,224, other leakage current sensing means are possible.

Figure 2:
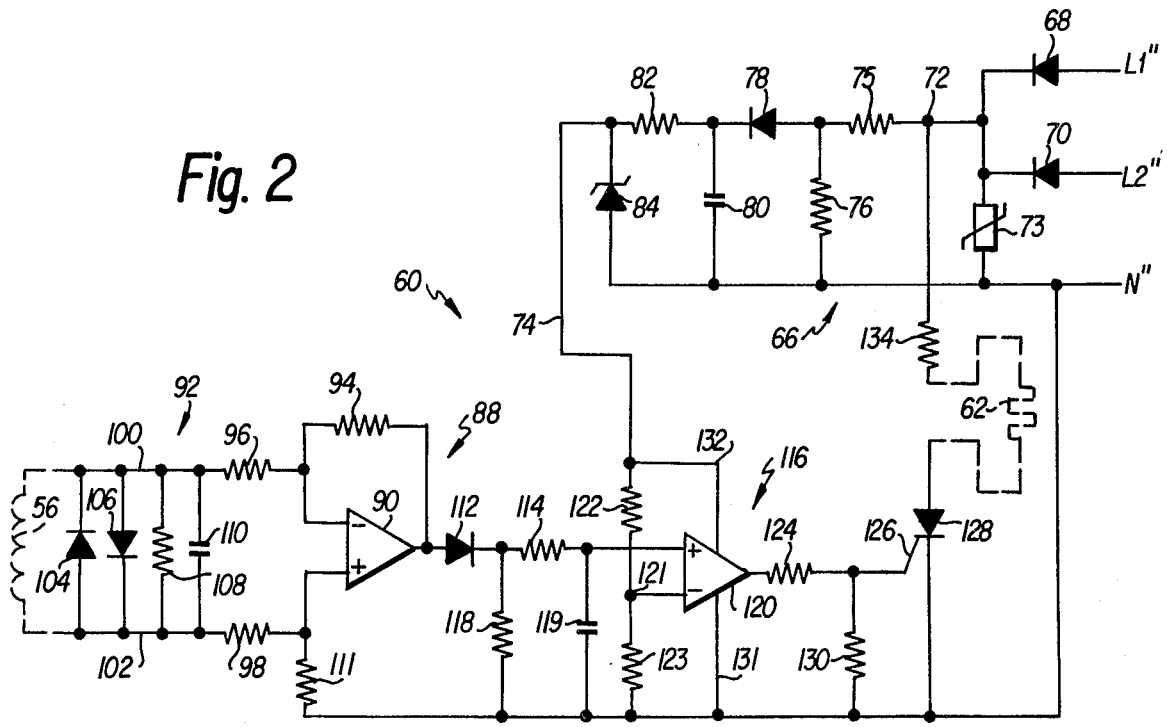

Referring to FIG. 2, the exemplary control circuit 60 will now be described. In FIG. 2, the differential current transformer secondary winding 56 and the hot wire relay heater 62 of FIG. 1 are shown in dash lines for clarity.

The circuit 60 includes a power supply section 66 comprising a pair of rectifier diodes 68 and 70 having their cathodes connected together and to a node 72, and their anodes connected to be supplied by the conductors L1" and L2". Accordingly, there is supplied to the node 72 full wave rectified AC power. For operation from a 240 volt AC grounded neutral source, the peak voltage at the node 72 is approximately 160 volts referenced to the N" conductor, which serves as a common reference point in the circuit 60. For protection against power line transients, a suitable metal oxide varistor (MOV) 73 is connected between the node 72 and the N" conductor.

In order to supply a lower rectified DC voltage to a supply conductor 74, a voltage divider comprising resistors 75 and 76 is supplied from the node 72 and has its midpoint output connected to the anode of an isolation diode 78, which in turn has its cathode connected to one terminal of a filter capacitor 80 and to a voltage dropping resistor 82. The other end of the resistor 82 is connected to the supply conductor 74 and to the cathode of a voltage regulating Zener diode 84. The anode the Zener diode 84, the other terminal of the capacitor 80, and the lower terminal of the voltage divider resistor 78 are all connected to the N" circuit reference point.

Considering now the functional part of the control circuit 60, an AC amplifier 88 having an approximate voltage gain of sixty comprises an operational amplifier 90 with an input network 92 connected to the terminals of the differential current transformer secondary winding 56. To establish the voltage gain of sixty, a negative feedback resistor 94 is connected between the output terminal and the inverting (−) input of the operational amplifier 90, and input resistors 96 and 98 are connected to the inverting (−) and non-inverting (+) inputs. The other ends of the input resistors 96 and 98 are connected through conductors 100 and 102 to the terminals of the differential current transformer secondary winding 56. To complete the input network 92, oppositely-polarized voltage limiting diodes 104 and 106 are connected across the conductors 100 and 102, along with a biasing resistor 108, and a noise suppression capacitor 110. For proper biasing of the amplifier 90, another resistor 111 is connected between the operational amplifier non-inverting (+) input and the N" reference conductor.

The output of the operational amplifier 90 is connected through a signal rectifier diode 112 and a current limiting resistor 114 to a voltage comparator generally designated 116. Additionally, a biasing resistor 118 connects the junction of the signal rectifier diode 112 and the resistor 114 to the N" circuit reference point, and a filter capacitor 119 is connected between the right-hand end of the resistor 114 and the circuit reference point. In operation, a DC voltage appears at the junction of the resistor 114 and the capacitor 119, with the magnitude of this voltage depending upon the degree of current imbalance as sensed by the differential current transformer 53.

The voltage comparator 116 comprises another operational amplifier 120 of which the non-inverting (+) input is the sense input and accordingly is connected to the junction of the resistor 114 and the capacitor 119. The inverting (−) input is the reference input and accordingly is connected to the midpoint 121 of a voltage divider comprising resistors 122 and 123 connected between the DC supply conductor 74 and the N" circuit reference point.

In the particular application of a range, due to capacitance effects, there is a fairly high AC leakage current, in the order of 200 milliamperes, which exists during normal operation. Accordingly, the comparator threshold established by the voltage divider resistors 122 and 123 is selected in view of the characteristics of the differential current transformer 53 and the gain of the amplifier 88 such that the interrupting means 47 is not activated for leakage currents less than 200 milliamperes.

To complete the circuit 60, the output of the operational amplifier 120 is connected through a current limiting resistor 124 to the gate terminal 126 of a silicon controlled rectifier (SCR) 128. The cathode of the SCR 128 is connected to the N" circuit reference terminal, and a biasing resistor 130 is connected between the SCR gate 126 and anode terminals.

In this particular circuit, the operational amplifiers 90 and 120 are included within a single integrated circuit package, and accordingly only one set of DC power supply connections is shown. Specifically, the operational amplifier ground connection is made through a conductor 131 to the N" circuit reference point, and the positive DC supply connection is made through a conductor 132 to the supply conductor 74.

To provide an output from the circuit 60 to the hot wire relay heater 62, the heater 62 is connected in series with a resistor 134 between the anode of the SCR 128 and the supply node 72. Accordingly, whenever the SCR 128 is gated into conduction, the heater 62 is energized, and after a thermal time delay the circuit interrupters 48 and 50 (FIG. 1) to interrupt the conductors L1" and L2". It should be noted that the node 72 has unfiltered fullwave rectified power such that the hot wire heater 62 responds in a series of relaxation steps as described in the above-mentioned U.S. Pat. No. 4,054,857 Bowling such that the switch contact opening is substantially synchronized with the zero current crossing so as to minimize arcing. Diode 78 serves to commutate the SCR 128 by isolating the DC voltage on capacitor 80 from the SCR.

The following component values have been found suitable for use in the circuit of FIG. 2. These values are provided merely by way of example, and are not intended to limit the scope of the claimed invention.

RESISTORS 75, 76: 10K Ohm, 1 Watt
82: 1K Ohm
94: 334K Ohm
96, 98: 5.1K Ohm
108: 1.8K Ohm
111: 100K Ohm 114: 51K Ohm
118: 1 Meg. Ohm
122, 123: 39K Ohm
124: 5.6K Ohm
130: 2K Ohm
134: 24 Ohm, 15 Watt, wirewound.

CAPACITORS

80: 10 mfd., 25 volt
110: 0.001 mfd.
119: 0.22 mfd.

SEMICONDUCTOR DEVICES 68, 70, 78: 1N4004 silicon diode
73: G.E. Type No. V150LA10A MOV
84: 8.1 Volt, ½ Watt Zener Diode
90, 120: Included within National Semiconductor Type No. LM358 dual op. amp. I.C.
104, 106, 112: 1N4001 silicon diode
128: G.E. Type No. C106Y SCR.

In the particular system disclosed herein, the time-delay for the interval which permits the overcurrent interruption means 36 and 38 of the power source 18 to interrupt large faults of the second class is provided by the thermal mass of the hot wire relay heater 62, and depends upon a proper selection of the value of the current limiting resistor 134 so as to limit the heater current. The lower the heater current, the longer will be the time delay.

However, it will be apparent that many other time-delay methods are possible, such as a simple RC time delay. If a conventional fast acting electromagnetic relay or a triac is employed for the controllable circuit interrupters 48 and 50, then the convenient time-delay effected by the combination of the hot wire relay and current limiting resistor 134 could not be used. In this situation, another time-delay method would be employed. For example, a digital timer may be started upon the sensing of the ground fault while the trigger pulse to open the contacts is generated a preselected time thereafter.

The precise time delay required is not critical and must be selected as a compromise between such factors as the overcurrent versus trip time characteristics of the power source interruption means 36 and 38, the actual current-interruption capability of the interrupters 48 and 50, and the degree of protection desired against incipient ground faults. As an example, a 200 millesecond time delay after exceeding a 200 milliampere current threshold has been found suitable.

It will be apparent, therefore, that there has been provided an effective and low-cost means for protecting a range or other load device characterized by drawing potentially heavy fault currents, wherein the ground fault interrupter device may have relatively low current interrupting capability.

While a specific embodiment of the invention has been illustrated and described herein, it is realized that modifications and changes will occur to those skilled in the art. It is therefore to be understood that the appended claims are intended to cover all such modifications and the changes as fall within the true spirit and scope of the invention.

What is claimed is:

1. An electric range including at least one sheathed electrical resistance heating unit of the type having a spiralled electrical resistance wire encased within an elongated ceramic-filled metal outer sheath connected to a ground reference point, said electric range further including load-supplying conductors adapted to be supplied from a power source having a first overcurrent interruption means for interrupting the power source when a predetermined current threshold is exceeded, said electric range being subject to a first class of failure characterized by a breakdown or an initial failure stage in the form of an incipient breakdown in the electrical insulation qualities of the ceramic material within said outer sheath with consequent excessive current flow between at least one of said conductors and the ground reference point with circuit current remaining at or below the predetermined current threshold and circuit current remaining below that of a major arcing ground fault, said electric range being subject to a second class of failure characterized by current through at least one of said conductors being above the predetermined current threshold, and said electric range comprising:

second means for interrupting at least one of said conductors in response to excessive current flow characteristic of an incipient ground fault between one of said conductors and the ground reference point, said second means for interrupting operating sufficiently quickly to potentially avoid failure of the heating unit beyond the incipient ground fault stage, and said second means for interrupting including means for preventing conductor interruption thereby in the event a failure of the second class occurs.

2. An electric range according to claim 1, wherein said second means for interrupting has a current-interrupting capability at least as high as the predetermined current threshold, but less than the maximum current which may flow during a failure of the second class.

3. An electric range according to claim 1, wherein said second means for interrupting comprises:

a controllable circuit interrupter which interrupts at least one of said conductors when activated, said controllable circuit interrupter having a current-interrupting capability at least as high as the predetermined current threshold, but less than the maximum current which may flow during a failure of the second class;

means for sensing excessive current flow between said at least one of said conductors and said ground reference point; and means connecting said sensing means to said controllable circuit interrupter for activating said controllable circuit interrupter in response to excessive current flow between one of said conductors and said ground reference point, said connecting means including time delay means for delaying the activation of said controllable circuit interrupter for an interval sufficient to allow the first overcurrent interrupting means to interrupt the power source in the event a failure of the second class occurs.

4. An electric range according to claim 1, which is adapted to be supplied from a standard single phase three-terminal power source having a pair of hot terminals at opposite potential with respect to a common neutral terminal.

5. An electric range according to claim 3, which is adapted to be supplied from a standard single phase three-terminal power source having a pair of hot terminals at opposite potential with respect to a common neutral terminal.

6. A protective device for protecting a sheathed electrical resistance heating unit included in an appliance having load-supplying conductors adapted to be supplied from a power source having a first overcurrent interrupter for interrupting the power source when a predetermined current threshold is exceeded, said sheathed electrical resistance heating unit being of the type including a spiralled electrical resistance wire electrically connected to said conductors and encased within an elongated electrically conductive outer sheath electrically connected to a ground reference point, with normally electrically insulating thermally conductive ceramic material within said outer sheath for electrically insulating said outer sheath from said resistance wire, said heating unit being subject to a relatively lower current class of failure characterized by a breakdown or an initial failure stage in the form of an incipient breakdown in the electrical insulation qualities of said ceramic material within said outer sheath with consequent current flow between at least one of said conductors and said ground reference point through at least a portion of said resistance wire and through said ceramic material with circuit current remaining at or below the predetermined current threshold of the first overcurrent interruption means and circuit current being below that of a major arcing ground fault, and said heating unit and said appliance also being subject to a relatively higher current class of failure characterized by current through at least one of said conductors being above the predetermined current threshold of the first overcurrent interrupter, said protective device comprising:

a second interrupter for interrupting at least one of said conductors in response to excessive current flow characteristic of an incipient ground fault between one of said conductors and said ground reference point, said second interrupter operating sufficiently quickly to potentially avoid failure of the heating unit beyond the incipient ground fault stage, and said second interrupter having a current-interrupting capability at least as high as the predetermined current threshold of the first overcurrent interrupter, but less than the maximum current which may flow during a failure of the relatively higher current class; and an element for preventing conductor interruption by said second interrupter in the event a failure of the relatively higher current class occurs.

7. A protective device according to claim 6, wherein said element for preventing conductor interruption is included within said second interrupter.

8. A protective device according to claim 7, wherein said second interrupter comprises:

a controllable circuit interrupter which interrupts at least one of said conductors when activated, said controllable circuit interrupter having a current-interrupting capability at least as high as the predetermined current threshold of the first overcurrent interrupter but less than the maximum current which may flow during a failure of the relatively higher current class;

a sensor for sensing excessive current flow between said at least one of said conductors and said ground reference point; and a connection between sensor and said controllable circuit interrupter for activating said controllable circuit interrupter in response to excessive current flow between said at least one of said conductors and said ground reference point, said connection including a time delay element for delaying the activation of said controllable circuit interrupter for an interval sufficient to allow the first overcurrent interrupter to interrupt the power source in the event a failure of the relatively higher current class occurs.

9. An electric range comprising:

load-supplying conductors adapted to be supplied from a power source having a first overcurrent interrupter for interrupting the power source when a predetermined current threshold is exceeded;

a ground reference point;

at least one sheathed electrical resistance heating unit including a spiralled electrical resistance wire electrically connected to said conductors and encased within an elongated electrically conductive outer sheath electrically connected to said ground reference point, and normally electrically insulating thermally conductive ceramic material also within said outer sheath for electrically insulating said outer sheath from said resistance wire;

said electric range being subject to a relatively lower current class of failure characterized by a breakdown or an initial failure stage in the form of an incipient breakdown in the electrical insulation qualities of said ceramic material within said outer sheath with consequent current flow between at least one of said conductors and said ground reference point through at least a portion of said resistance wire and through said ceramic material, with circuit current remaining at or below the predetermined current threshold of the first overcurrent interrupter and circuit current below that of a major arcing ground fault;

said electric range being subject to a relatively higher current class of failure characterized by current through at least one of said conductors being above the predetermined current threshold of the first overcurrent interrupter; and a second interrupter for interrupting at least one of said conductors in response to excessive current flow characteristic of an incipient ground fault between one of said conductors and said ground reference point, said second interrupter operating sufficiently quickly to potentially avoid failure of the heating unit beyond the incipient ground fault stage, and said second interrupter having a current-interrupting capability at least as high as the predetermined current threshold of the first overcurrent interrupter, but less than the maximum current which may flow during a failure of the relatively higher current class, and said second interrupter including an element for preventing conductor interruption thereby in the event a failure of the relatively higher current class occurs.

10. An electric range according to claim 9, wherein the relatively higher current class of failure includes major arcing ground faults, short circuits anywhere in said range between one of said conductors and said ground reference point, and shorts between said conductors.

11. An electric range according to claim 9, wherein said second interrupter comprises:

a controllable circuit interrupter which interrupts at least one of said conductors when activated, said controllable circuit interrupter having a current-interrupting capability at least as high as the predetermined current threshold of the first overcurrent interrupter but less than the maximum current which may flow during a failure of the relatively higher current class;

a sensor for sensing excessive current flow between said at least one of said conductors and said ground reference point; and a connection between said sensor and said controllable circuit interrupter for activating said controllable circuit interrupter in response to excessive current flow between said at least one of said conductors and said ground reference point, said connection including a time delay element for delaying the activation of said controllable circuit interrupter for an interval sufficient to allow the first overcurrent interrupter to interrupt the power source in the event a failure of the relatively higher current class occurs.

12. An electric range according to claim 9, which is adapted to be supplied from a standard single phase three-terminal power source having a pair of hot terminals at opposite potential with respect to a common neutral terminal.

13. An electric range according to claim 11, which is adapted to be supplied from a standard single phase three-terminal power source having a pair of hot terminals at opposite potential with respect to a common neutral terminal.

14. An electric range according to claim 1, wherein said second means for interrupting interrupts within in the order of 200 milliseconds after ground fault current exceeds a threshold of in the order of 200 milliamperes.

15. A protective device according to claim 6, wherein said second interrupter interrupts within in the order of 200 milliseconds after ground fault current exceeds a threshold of in the order of 200 milliamperes.

16. An electric range according to claim 9, wherein said second interrupter interrupts within in the order of 200 milliseconds after ground fault current exceeds a threshold of in the order of 200 milliamperes.

* * * * *